(12) United States Patent
Xu et al.

(10) Patent No.: US 12,273,868 B2
(45) Date of Patent: Apr. 8, 2025

(54) ELECTRONIC DEVICE AND METHOD FOR WIRELESS COMMUNICATION, AND COMPUTER-READABLE STORAGE MEDIUM

(71) Applicant: Sony Group Corporation, Tokyo (JP)

(72) Inventors: Jin Xu, Beijing (CN); Xinli Wang, Beijing (CN); Ying Zhou, Beijing (CN); Jianfei Cao, Beijing (CN)

(73) Assignee: SONY GROUP CORPORATION, Tokyo (JP)

( * ) Notice: Subject to any disclaimer, the term of this patent is extended or adjusted under 35 U.S.C. 154(b) by 312 days.

(21) Appl. No.: 17/921,989

(22) PCT Filed: Jun. 7, 2021

(86) PCT No.: PCT/CN2021/098600
§ 371 (c)(1),
(2) Date: Oct. 28, 2022

(87) PCT Pub. No.: WO2021/249336
PCT Pub. Date: Dec. 16, 2021

(65) Prior Publication Data
US 2023/0199584 A1 Jun. 22, 2023

(30) Foreign Application Priority Data
Jun. 12, 2020 (CN) .......................... 202010535175.8

(51) Int. Cl.
*H04B 7/06* (2006.01)
*H04W 72/044* (2023.01)
(52) U.S. Cl.
CPC ........ *H04W 72/046* (2013.01); *H04B 7/0695* (2013.01)

(58) Field of Classification Search
CPC ........... H04W 72/046; H04W 36/0083; H04W 36/0005; H04W 36/085; H04W 72/20; H04B 7/0695; H04B 7/06964
See application file for complete search history.

(56) References Cited

U.S. PATENT DOCUMENTS 11,368,205 B2 * 6/2022 Guan ..................... H04W 76/18
2018/0206170 A1 * 7/2018 Nagaraja .............. H04B 7/0695
(Continued)

FOREIGN PATENT DOCUMENTS

| CN | 110178317 A | 8/2019 |
| CN | 110268741 A | 9/2019 |
| CN | 111479289 A | 7/2020 |

OTHER PUBLICATIONS

International Search Report and Written Opinion mailed on Aug. 4, 2021, received for PCT Application PCT/CN2021/098600, Filed on Jun. 7, 2021, 11 pages including English Translation.
(Continued)

*Primary Examiner* — Kenneth T Lam
(74) *Attorney, Agent, or Firm* — XSENSUS LLP

(57) ABSTRACT

An electronic device and a method for wireless communication, and a computer-readable storage medium. The electronic device comprises: a processing circuit, configured to: acquire, from a base station, configuration information containing a first candidate beam set for beam failure recovery, the first candidate beam set comprising candidate beams of a serving cell and candidate beams of a non-serving cell; and determine, on the basis of the first candidate beam set and/or a second candidate beam set, an identification candidate beam to be used for beam failure recovery, the second candidate beam set comprising beams which serve as candidate beams of the non-serving cell and are detected by user equipment.

19 Claims, 10 Drawing Sheets

(56) References Cited

U.S. PATENT DOCUMENTS

| | | | | |
|---|---|---|---|---|
| 2019/0364445 | A1* | 11/2019 | Kang | H04W 24/04 |
| 2020/0083947 | A1 | 3/2020 | Islam et al. | |
| 2020/0084089 | A1* | 3/2020 | Da Silva | H04W 16/28 |
| 2020/0374960 | A1* | 11/2020 | Deenoo | H04B 7/0695 |
| 2021/0185754 | A1* | 6/2021 | Da Silva | H04W 76/19 |
| 2021/0227613 | A1* | 7/2021 | Zhang | H04W 24/08 |
| 2022/0094416 | A1* | 3/2022 | Huang | H04W 76/19 |
| 2022/0174567 | A1* | 6/2022 | Awada | H04W 36/305 |
| 2022/0225421 | A1* | 7/2022 | Miao | H04B 7/0617 |
| 2023/0144010 | A1* | 5/2023 | Kwak | H04L 5/0053 |
| | | | | 370/329 |

OTHER PUBLICATIONS

ZTE, "Further details on Multi-beam and Multi-TRP operation", 3GPP TSG RAN WG1 Meeting #104-e e-Meeting, R1-2100292, Jan. 25-Feb. 5, 2020, 20 pages.

* cited by examiner

ELECTRONIC DEVICE AND METHOD FOR WIRELESS COMMUNICATION, AND COMPUTER-READABLE STORAGE MEDIUM

CROSS-REFERENCE TO RELATED APPLICATIONS

This application is based on PCT filing PCT/CN2021/098600, filed Jun. 7, 2021, which claims the priority to Chinese Patent Application No. 202010535175.8 titled "ELECTRONIC DEVICE AND METHOD FOR WIRELESS COMMUNICATION, AND COMPUTER-READABLE STORAGE MEDIUM", filed on Jun. 12, 2020 with the China National Intellectual Property Administration (CNIPA), the entire contents of each of which are incorporated herein by reference in its entirety.

FIELD

The present disclosure relates to the technical field of wireless communications, and in particular to a beam failure recovery (BFR) mechanism. More particularly, the present disclosure relates to an electronic apparatus and a method for wireless communications and a computer-readable storage medium.

BACKGROUND

BFR is designed to avoid frequent link failures caused by a beam misalignment between a base station (gNB) and user equipment (UE). In a BFR procedure, a set $\overline{q}_0$ of resource indexes for a beam failure detection (BFD) reference signal (BFD-RS) (such as, a periodic channel state information reference signal (CSI-RS)) is defined. The UE determines whether a beam failure event occurs by measuring quality of the BFD-RS in the set. When a beam failure event occurs, the UE is required to identify a candidate beam for BFR in a set $\overline{q}_1$ of candidate beams. The set $\overline{q}_1$ of candidate beams is a periodic CSI-RS resource index and/or a synchronous signal/physical broadcast channel (SS/PBCH) block index configured by a high-layer parameter Candidate-Beam-RS-List.

In a process of the candidate beam identification, only when a physical layer reference signal received power (L1-RSRP) of a beam in the set $\overline{q}_1$ is greater than or equal to a threshold $Q_{in,LR}$, the beam is considered as an available candidate beam and is reported to the high layer. Therefore, according to a current BFR procedure, the UE can only be reconnected to a current serving cell during the BFR. However, in some cases, a L1-RSRP value of a beam from a non-serving cell may be greater than a L1-RSRP value of a beam from a serving cell. Since beams from the non-serving cell are not in the set $\overline{q}_1$, the UE cannot determine the beams as the candidate beams and reconnect to the non-serving cell.

SUMMARY

In the following, an overview of the present disclosure is given simply to provide basic understanding to some aspects of the present disclosure. It should be understood that this overview is not an exhaustive overview of the present disclosure. It is not intended to determine a critical part or an important part of the present disclosure, nor to limit the scope of the present disclosure. An object of the overview is only to give some concepts in a simplified manner, which serves as a preface of a more detailed description described later.

An electronic apparatus for wireless communications is provided according to an aspect of the present disclosure. The electronic apparatus includes processing circuitry configured to: acquire, from a base station, configuration information including a first candidate beam set for beam failure recovery, where the first candidate beam set includes a candidate beam of a serving cell and a candidate beam of a non-serving cell; and determine, based on the first candidate beam set and/or a second candidate beam set, an identified candidate beam to be used for the beam failure recovery, where the second candidate beam set includes a beam of a non-serving cell which serves as a candidate beam and is detected by the user equipment.

A method for wireless communications is provided according to an aspect of the present disclosure. The method includes: acquiring, from a base station, configuration information including a first candidate beam set for beam failure recovery, where the first candidate beam set includes a candidate beam of a serving cell and a candidate beam of a non-serving cell; and determining, based on the first candidate beam set and/or a second candidate beam set, an identified candidate beam to be used for the beam failure recovery, where the second candidate beam set includes a beam of a non-serving cell which serves as a candidate beam and is detected by the user equipment.

An electronic apparatus for wireless communications is provided according to another aspect of the present disclosure. The electronic apparatus includes processing circuitry configured to: provide, to user equipment, configuration information including a first candidate beam set for beam failure recovery, where the first candidate beam set includes a candidate beam of a serving cell and a candidate beam of a non-serving cell; and acquire, from the user equipment, information of an identified candidate beam to be used for the beam failure recovery determined by the user equipment based on the first candidate beam set and/or a second candidate beam set, where the second candidate beam set includes a beam of a non-serving cell which serves as a candidate beam and is detected by the user equipment.

A method for wireless communications is provided according to another aspect of the present disclosure. The method includes: providing, to user equipment, configuration information including a first candidate beam set for beam failure recovery, where the first candidate beam set includes a candidate beam of a serving cell and a candidate beam of a non-serving cell; and acquiring, from the user equipment, information of an identified candidate beam to be used for the beam failure recovery determined by the user equipment based on the first candidate beam set and/or a second candidate beam set, where the second candidate beam set includes a beam of a non-serving cell which serves as a candidate beam and is detected by the user equipment.

According to the electronic apparatus and the method in the present disclosure, the UE can recover to the non-serving cell when a beam failure event occurs, thereby improving the communication quality of the UE.

According to other aspects of the present disclosure, there are further provided computer program codes and computer program products for implementing the methods for wireless communications above, and a computer readable storage medium having recorded thereon the computer program codes for implementing the methods for wireless communications described above.

These and other advantages of the present disclosure will be more apparent from the following detailed description of preferred embodiments of the present disclosure in conjunction with the accompanying drawings.

BRIEF DESCRIPTION OF THE DRAWINGS

To further set forth the above and other advantages and features of the present disclosure, detailed description will be made in the following taken in conjunction with accompanying drawings in which identical or like reference signs designate identical or like components. The accompanying drawings, together with the detailed description below, are incorporated into and form a part of the specification. It should be noted that the accompanying drawings only illustrate, by way of example, typical embodiments of the present disclosure and should not be construed as a limitation to the scope of the disclosure. In the accompanying drawings.

DETAILED DESCRIPTION OF EMBODIMENTS

An exemplary embodiment of the present disclosure will be described hereinafter in conjunction with the accompanying drawings. For the purpose of conciseness and clarity, not all features of an embodiment are described in this specification. However, it should be understood that multiple decisions specific to the embodiment have to be made in a process of developing any such embodiment to realize a particular object of a developer, for example, conforming to those constraints related to a system and a service, and these constraints may change as the embodiments differs. Furthermore, it should also be understood that although the development work may be very complicated and time-consuming, for those skilled in the art benefiting from the present disclosure, such development work is only a routine task.

Here, it should also be noted that in order to avoid obscuring the present disclosure due to unnecessary details, only a device structure and/or processing steps closely related to the solution according to the present disclosure are illustrated in the accompanying drawing, and other details having little relationship to the present disclosure are omitted.

First Embodiment

Figure 1:
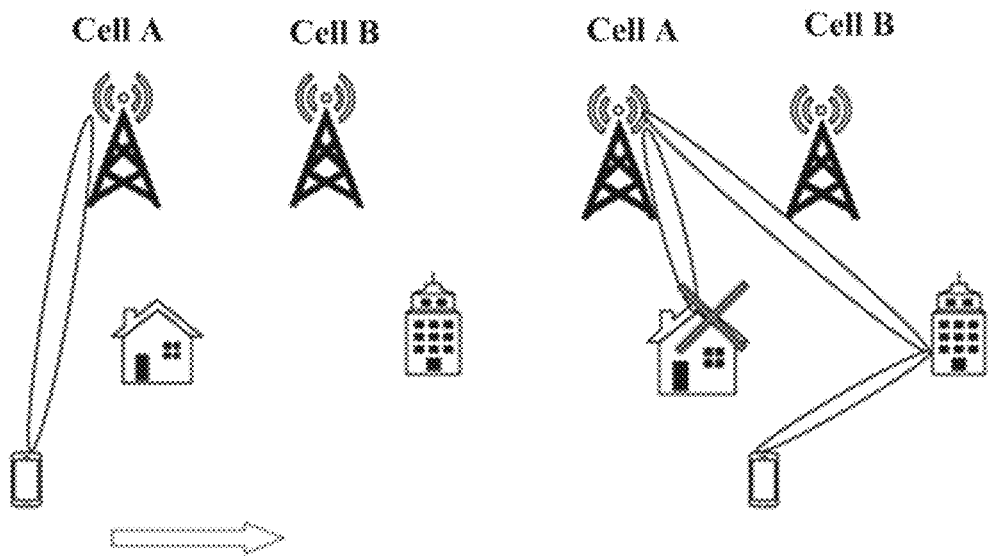
FIG. 1 is a schematic diagram showing beam failure recovery in a scenario of multiple cells.

FIG. 1 is a schematic diagram showing beam failure recovery in a scenario of multiple cells. A cell A is a serving cell of a UE, and a cell B is a non-serving cell of the UE. A beam failure event occurs due to shadow of a house. In the conventional technology, even if the cell B may provide better service quality, the UE may only recover to the cell A. In order to further improve the service quality for the UE, an electronic apparatus 100 for wireless communication is provided according to the embodiment, so that the UE may recover to the serving cell or the non-serving cell when a beam failure event occurs, to improve flexibility and reliability of the beam failure recovery.

Figure 2:
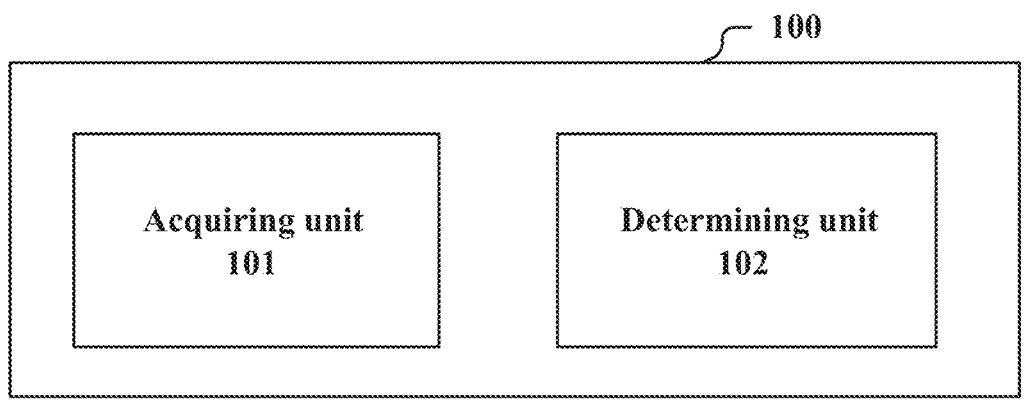
FIG. 2 is a block diagram showing functional modules of an electronic apparatus for wireless communications according to an embodiment of the present disclosure.

FIG. 2 is a block diagram showing functional modules of an electronic apparatus 100 for wireless communications according to an embodiment of the present disclosure. The electronic apparatus 100 includes an acquiring unit 101 and a determining unit 102. The acquiring unit 101 is configured to acquire, from a base station, configuration information including a first candidate beam set for beam failure recovery, where the first candidate beam set includes a candidate beam of a serving cell and a candidate beam of a non-serving cell. The determining unit 102 is configured to determine, based on the first candidate beam set and/or a second candidate beam set, an identified candidate beam to be used for beam failure recovery, where the second candidate beam set includes a beam of a non-serving cell which serves as a candidate beam and is detected by the user equipment.

The acquiring unit 101 and the determining unit 102 may be implemented by one or more processing circuitries. The processing circuitry may be implemented as, for example, a chip. In addition, it should be understood that various functional units in apparatus shown in FIG. 2 are logical modules divided based on functions implemented by these functional units, and are not intended to limit specific implementations.

The electronic apparatus 100 may be, for example, arranged on a user equipment (UE) side, or may be communicatively connected to the UE. Here, it is further to be noted that the electronic apparatus 100 may be implemented in a chip level or a device level. For example, the electronic apparatus 100 may function as the user equipment itself and may further include external devices such as a memory and a transceiver (not shown in FIG. 2). The memory may be configured to store programs to be executed when the user equipment implements various functions and related data information. The transceiver may include one or more communication interfaces to support communications with different devices (for example, a base station, other user equipment and the like). Implementations of the transceiver are not limited herein.

In addition, it should be noted that "first", "second" and the like in the present disclosure are only used to distinguish one object from another object, and represent no meaning of order.

Figure 3:
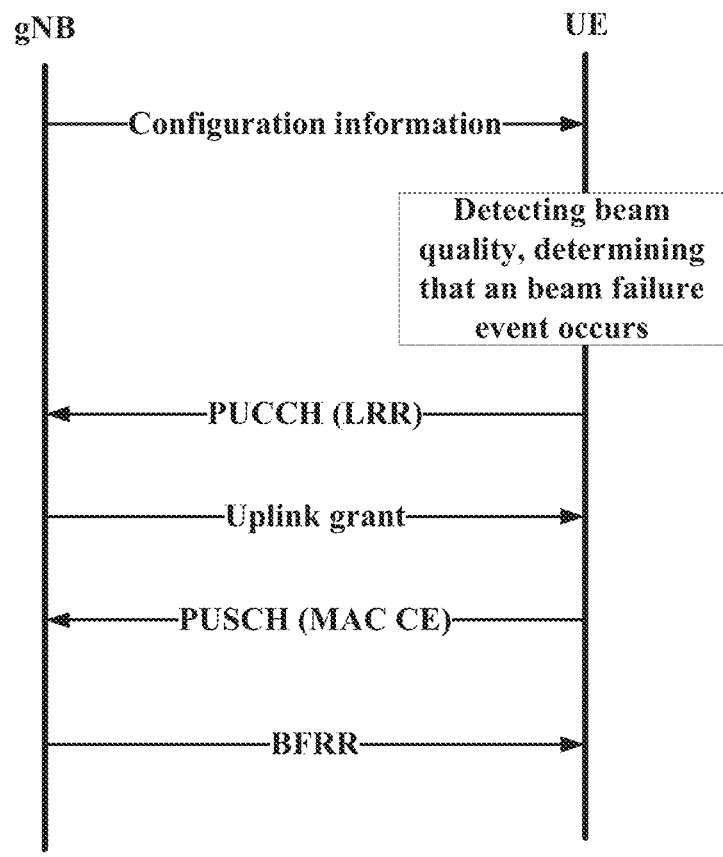
FIG. 3 is a schematic diagram showing an information procedure related to BFR between the gNB and UE.

For convenience of understanding, FIG. 3 is a schematic diagram showing an information procedure related to BFR between a gNB and UE. First, the gNB transmits configuration information related to the BFR to the UE, for example, through radio resources control (RRC) signaling. The configuration information may include the configuration information of the above mentioned first candidate beam set, and may also include other configuration information, such as configuration information of the BFD-RS. The UE performs beam quality detection on a BFD-RS in a set $\bar{q}_0$ and determines that a beam failure event occurs. At this time, the UE transmits a beam failure recovery request (BFRQ) to the gNB. For example, the UE transmits a link recovery request (LRR) to the gNB through a physical uplink control channel (PUCCH) to request uplink grant (UL grant). The gNB then transmits the UL grant to the UE. Based on the UL grant, the UE transmits a MAC CE to the base station on corresponding physical uplink shared channel (PUSCH) resources. The MAC CE may include information for an identified candidate beam determined by the UE. The gNB transmits a beam failure recovery request response (BFRR) to the UE in response to the received BFRQ.

It can be seen that a BFR mechanism executed on a UE side may include, for example, a beam failure determination phase, a candidate beam identification phase, a BFRQ transmission phase and a BFRR acquisition phase. During the beam failure determination phase, the UE performs beam quality detection on a current serving beam to determine whether a trigger condition for beam failure is met. For example, a block error rate (BLER) of the serving beam may be compared with a threshold of the BLER to determine whether a beam failure occurs. During the candidate beam identification phase, a candidate beam that may be used as an alternative to the current serving beam is selected from other beams. During the BFRQ transmission phase, the BFRQ is transmitted to the base station (such as, the gNB). During the BFRR acquisition phase, the UE monitors the BFRR in response to BFRQ from the base station within a specific time window.

According to the embodiment, during the candidate beam identification phase, beams for candidate beam selection may include not only a candidate beam of the serving cell, but also a candidate beam of the non-serving cell. In addition, the candidate beam of the non-serving cell may be configured by the base station for the UE, or may be detected by the UE itself.

As described above, the first candidate beam set includes the candidate beam of the serving cell and the candidate beam of the non-serving cell that are configured by the base station for the UE, and the second candidate beam set includes the candidate beam of the non-serving cell detected by the UE itself. It should be understood that the first candidate beam set may include only the candidate beam of the serving cell. In this case, all candidate beams of the non-serving cell are detected by the UE itself. Alternatively, all the candidate beam of the non-serving cell may also be configured by the base station. In this case, the UE does not detect the candidate beam of the non-serving cell by itself, that is, the second candidate beam set is empty.

Herein, when a beam failure event occurs, the determining unit 102 determines an available candidate beam from among the first candidate beam set and/or the second candidate beam set, and the determined available candidate beam is referred to as the identified candidate beam. During the BFRQ transmission phase, the UE provides information of the identified candidate beam to the base station, so that the base station can determine a beam to which the UE is to recover.

The candidate beam may be indicated by a reference signal. The reference signal includes, for example, a CSI-RS and an SSB. For example, configuration information acquired from the base station may include an index of the reference signal corresponding to the candidate beam and a physical cell identification (PCI) of a cell corresponding to the reference signal. The corresponding pseudo codes are shown below, for example.

```
CandidateBeamRS ::=    SEQUENCE {
    candidateBeamConfig            choice {
        ssb r16                        SSB Index,
        csi-RS-r16                     NZP-CSI-RS-ResourceId
    },
    PCI            Physical Coll ID    OPTIONAL --
Need R
}
```

If the reference signal corresponds to the serving cell, a PCI of the corresponding serving cell may be omitted or set to a default value. As described above, the acquiring unit 101 may acquire the configuration information through RRC signaling.

In an example, the candidate beam in the first candidate beam set may include a beam corresponding to a reference signal for mobility management configured by the base station for the UE. The corresponding pseudo codes are shown below, for example.

```
CSI RS-CellMobility ::=    SEQUENCE {
    collId                     PhysCellId,
    csi rs Measurement BW      SEQUENCE {
        nrofPRBs                   ENUMERATED { size24, size48, size96, size192, size264},
        startPRB                   INTEGER(0..2169)
    },
    density                    ENUMERATED {d1,d3} OPTIONAL, Nood p
    csi rs ResourceList Mobility   SEQUENCE (SIZE (1..maxNrofCSI RS ResourcesRRM) ) OF
CSI-RS-Resource-Mobility
}
```

In the example, since the base station has configured the reference signals for mobility management for the UE, the UE may reuse the reference signals without additional configuration, reducing signaling overhead.

In addition, the second candidate beam set may include a beam corresponding to a SSB of the non-serving cell which is detected by the UE. The determining unit 102 may determine a PCI of the cell corresponding to the candidate beam in the second candidate beam set by decoding a primary synchronization signal/a secondary synchronization signal (PSS/SSS).

Figure 4:
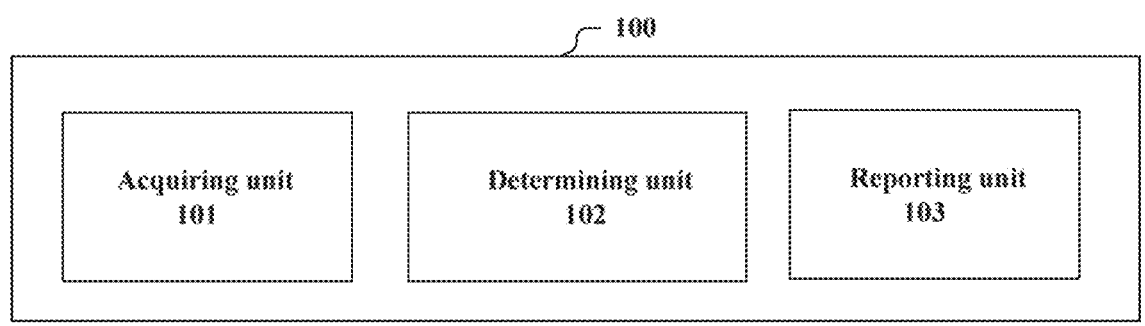
FIG. 4 is a block diagram showing functional modules of an electronic apparatus for wireless communications according to an embodiment of the present disclosure.

As shown in FIG. 4, the electronic apparatus 100 may further include a reporting unit 103. The reporting unit 103 is configured to report information of the identified candidate beam to the base station. The information of the identified candidate beam includes, for example, the identification or an index of a reference signal corresponding to the identified candidate beam.

In a case that the identified candidate beam is a candidate beam in the first candidate beam set, since the beams in the first candidate beam set are configured by the base station, the reporting unit 103 is not required to report the PCI of the identified candidate beam to the base station. On the other hand, in a case that the identified candidate beam includes the candidate beam in the second candidate beam set, since such an identified candidate beam is not configured by the base station, the UE is further required to provide information of a cell to which the identified candidate beam belongs to the base station. At this time, the information of the identified candidate beam may further include a PCI of a cell corresponding to the identified candidate beam.

For example, the reporting unit 103 is configured to provide, to the base station, information of the candidate beam belonging to the second candidate beam set which is included in the identified candidate beam and a PCI of a cell corresponding to the candidate beam. In this way, the base station may determine which non-serving cell the candidate beam belongs to.

As shown in FIG. 3, the reporting unit 103 may provide information of the identified candidate beam by transmitting the MAC CE on the PUSCH.

A range of a candidate beam for BFR in the present disclosure is extended to beams of the non-serving cell, and thus it is expected to provide a method for quickly determining the identified candidate beam to meet delay requirements of BFR.

As an example, a double threshold determination method may be used. Specifically, the acquiring unit 101 acquires information of a first threshold and a second threshold from the base station. In a case that the number of times of occurrences of beam failure event instances reaches or exceeds the first threshold, the determining unit 102 starts determination of the identified candidate beam; in a case that the number of times of occurrences of the beam failure event instances reaches or exceeds the second threshold, the determining unit 102 determines that a beam failure event occurs and starts a BFR procedure, where the first threshold is smaller than or equal to the second threshold. Similarly, the acquiring unit 101 may acquire, from the base station, the information of the first threshold and the second threshold through RRC signaling.

It can be seen that with the double threshold determination method, the determination of the identified candidate beam may be started before the BFR procedure is started (that is, the beam failure event is reported to the base station), so that the information of the identified candidate beam can be quickly provided to the base station after the BFR procedure is started, thereby reducing the time delay.

For example, the determining unit 102 may establish a first counter and a second counter respectively to count the number of times of occurrences of the beam failure event instances, compare a count value of the first counter with the first threshold, and compare a count value of the second counter with the second threshold.

For example, an existing BFI-COUNTER serves as the second counter, and a BFI-COUNTER* is additionally established as the first counter, an existing threshold beamFailureInstanceMaxCount for determining the occurrence of the beam failure event serves as the second threshold, and a new counter threshold beamFailureInstance* serves as the first threshold, where beamFailureInstance*≤beamFailureInstanceMaxCount.

Upon receipt of a beam failure event instance from a bottom layer, both BFI-COUNTER* and BFI-COUNTER are increased by one. In a case that BFI-COUNTER*>=beamFailureInstance*, BFI-COUNTER* is no longer increased, and the UE performs the determination of the identified candidate beam at this time. A range of the beams for determination includes a candidate beam of non-serving cell. In a case that BFI-COUNTER>=beamFailureInstanceMaxCount, BFI-COUNTER is no longer increased, the BFR procedure is started at this time, and the UE reports the beam failure event and information of the identified candidate beam to the gNB.

In addition, when a beam failure event occurs, recovering the beam to the non-serving cell incurs more signaling overhead than recovering the beam to the serving cell, and thus a specific condition may be set for recovering to the non-serving cell. For example, the determining unit 102 is configured to determine a candidate beam of a non-serving cell in the first candidate beam set and/or the second candidate beam set as the identified candidate beam in the following conditions: beam quality of the candidate beam of the serving cell being lower than predetermined quality; and beam quality of the candidate beam of the non-serving cell being higher than the beam quality of the candidate beam of the serving cell by more than a predetermined value.

The acquiring unit 101 may acquire, from the base station, settings of the predetermined quality and the predetermined value. For example, the acquiring unit 101 may acquire the settings through RRC signaling. Alternatively, the settings about the predetermined quality and the predetermined value may further be default by the UE and the base station.

Figure 5:
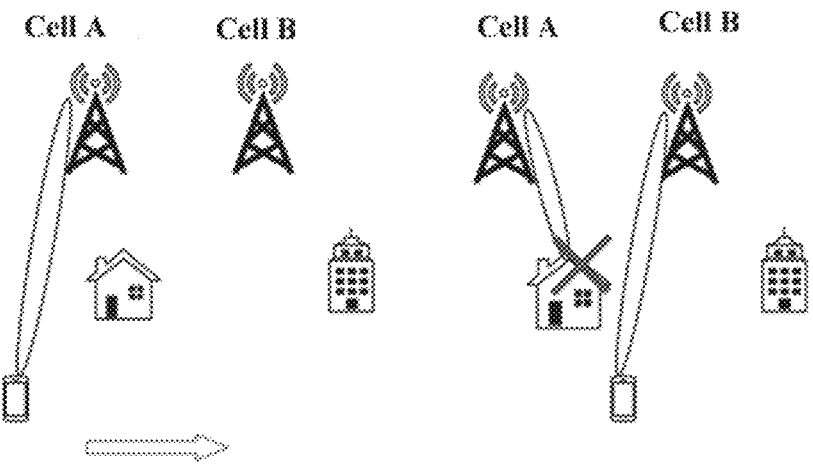
FIG. 5 is a schematic diagram showing an example that a UE recovers to a non-serving cell.

FIG. 5 is a schematic diagram showing an example that the UE recovers to a non-serving cell. The quality of the candidate beam of the serving cell is poor due to the block of the house and the quality of the candidate beam of the non-serving cell is good, so as to meet the above two conditions. Therefore, the UE determines the candidate beam of the non-serving cell as the identified candidate beam and recovers to the non-serving cell.

By setting specific conditions, the communication quality of the UE can be improved, while unnecessary signaling overhead can be reduced as much as possible.

In a case that the identified candidate beam is the candidate beam of the non-serving cell in the first candidate beam set and/or the second candidate beam set, that is, in a case that the UE is to recover to the candidate beam of the non-serving cell, considering that the original configuration of the UE may become invalid in a different cell, the process of the UE in an RRC connected state recovering to the non-serving cell would involve a cell handover. In order to simplify the complexity and reduce the signaling overhead and delay, the cell handover procedure is combined with the BFR procedure in the embodiment.

For example, the acquiring unit 101 may be configured to acquire, from the base station, RRC reconfiguration information for the non-serving cell during the BFR procedure. For example, the RRC reconfiguration information for the non-serving cell may be included in the BFRR transmitted by the base station.

Figure 6:
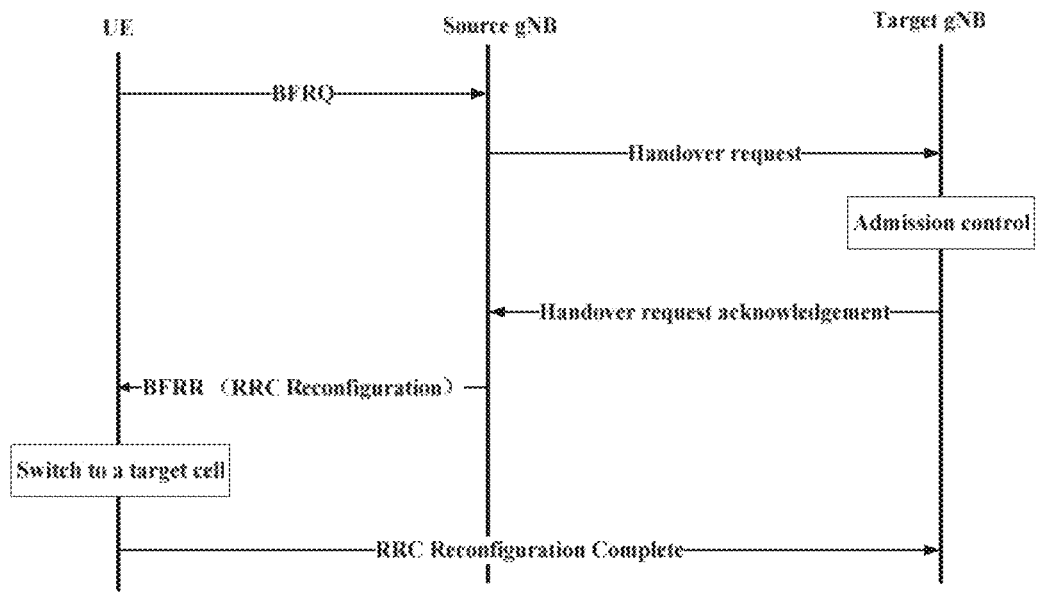
FIG. 6 is a schematic diagram showing an information procedure combining BFR with a cell handover procedure.

FIG. 6 is a schematic diagram showing an information procedure combining BFR with the cell handover procedure. A source gNB is a gNB of a current serving cell. The BFRQ may represent an LLR and provision of information of the identified candidate beam shown in FIG. 3. The source gNB determines that the UE is to recover to a target cell based on the information of the identified candidate beam, and transmits a handover request to the gNB (that is, a target gNB) of the target cell. The target gNB transmits a handover request acknowledgement to the source gNB after the determination of admission control. Next, the source gNB transmits a BFRR to the UE. The BFRR includes RRC reconfiguration information of the target cell. The UE switches to the target cell and completes the RRC reconfiguration.

It can be seen that the signaling overhead and delay can be effectively reduced by including the RRC reconfiguration information of the target cell in the BFRR. It should be noted that the information procedure in FIG. 6 is only schematic and does not constitute limitation to the present disclosure.

In summary, the electronic apparatus 100 according to the embodiment enables the UE to recover to the non-serving cell when a beam failure event occurs, thereby improving the communication quality of the UE. In addition, by improving the identification operation of the candidate beam and/or improving the procedure of recovering to the non-serving cell, the signaling overhead and delay are reduced, further improving the communication quality of the UE.

Second Embodiment

Figure 7:
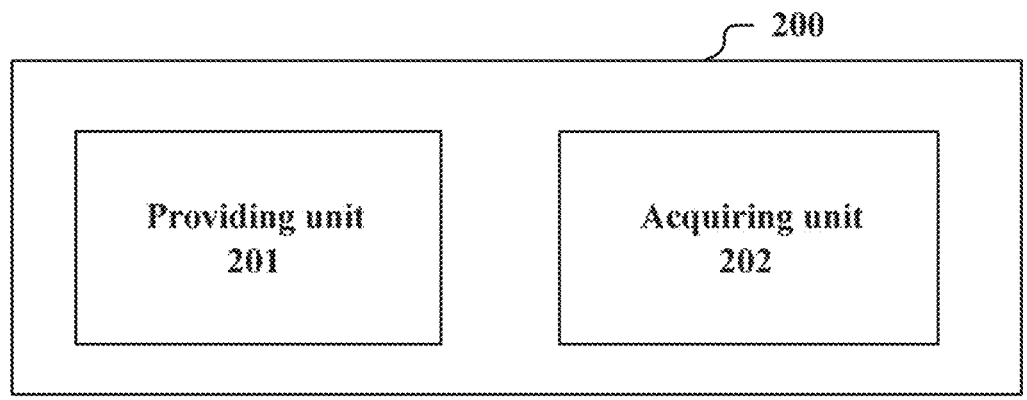
FIG. 7 is a block diagram showing functional modules of an electronic apparatus for wireless communications according to another embodiment of the present disclosure.

FIG. 7 is a block diagram showing functional modules of an electronic apparatus 200 for wireless communications according to another embodiment of the present disclosure. As shown FIG. 7, the electronic apparatus 200 includes a providing unit 201 and an acquiring unit 202. The providing unit 201 is configured to provide, to a UE, configuration information including a first candidate beam set for beam failure recovery, where the first candidate beam set includes a candidate beam of a serving cell and a candidate beam of a non-serving cell. The acquiring unit 202 is configured to acquire, from the UE, information of an identified candidate beam to be used for the BFR determined by the UE based on the first candidate beam set and/or a second candidate beam set, where the second candidate beam set includes a beam of a non-serving cell which serves as a candidate beam and is detected by user equipment.

The providing unit 201 and the acquiring unit 202 may be implemented by one or more processing circuitries. The processing circuitry may be implemented as, for example, a chip. In addition, it should be understood that various functional units in apparatus shown in FIG. 7 are logical modules divided based on functions implemented by these functional units, and are not intended to limit specific implementations.

The electronic apparatus 200 may be, for example, arranged on a base station side, or may be communicatively connected to the base station. Here, it is further to be noted that the electronic apparatus 200 may be implemented in a chip level or a device level. For example, the electronic apparatus 200 may function as the base station itself and may further include external devices such as a memory and a transceiver (not shown in FIG. 7). The memory may be configured to store programs to be executed when the base station implements various functions and related data information. The transceiver may include one or more communication interfaces to support communications with different devices (for example, user equipment, other base stations and the like). Implementations of the transceiver are not limited herein.

According to the embodiment, the base station may configure the candidate beam of the non-serving cell for the UE as a candidate beam for BFR, so that the UE can recover to the non-serving cell as needed. In addition, the candidate beam of the non-serving cell may be configured by the base station for the UE, or may be detected by the UE itself. As in the first embodiment, the candidate beam of the non-serving cell detected by the UE may be included in the second candidate beam set.

It should be understood that the first candidate beam set may include only the candidate beam of the serving cell. In this case, all the candidate beams of the non-serving cell are detected by the UE itself. Alternatively, all the candidate beams of the non-serving may be configured by the base station. In this case, the UE does not detect the candidate beam of the non-serving cell itself, that is, the second candidate beam set is empty.

When a beam failure event occurs, the UE determines an available candidate beam from among the first candidate beam set and/or the second candidate beam set, and the determined available candidate beam is referred to as the identified candidate beam. The base station acquires information of the identified candidate beam from the UE and determines a beam to which the UE is to recover.

As described above, the candidate beam may be indicated by the reference signal. The reference signal includes, for example, a CSI-RS, an SSB or the like. For example, the configuration information may include the index of the reference signal corresponding to the candidate beam and the PCI of the cell corresponding to the reference signal. The corresponding pseudo codes are described in the first embodiment and are not repeated herein. If the reference signal corresponds to a serving cell, the PCI of the corresponding serving cell may be omitted or set as a default value. The providing unit 201 may provide the configuration information, for example, through RRC signaling.

In an example, the candidate beam in the first candidate beam set may include a beam corresponding to a reference signal for mobility management configured by the base station for the UE. In this example, since the base station has configured the reference signals for mobility management for the UE, the UE may reuse the reference signals without additional configuration, reducing signaling overhead.

In addition, the second candidate beam set may include the beam corresponding to the SSB of the non-serving cell detected by the UE. Moreover, the UE may determine a PCI of the cell corresponding to the candidate beam in the second candidate beam set by decoding the PSS/SSS.

The acquiring unit 202 is further configured to acquire the information of the identified candidate beam from the UE. The information of the identified candidate beam includes, for example, an identification or index of a reference signal corresponding to the identified candidate beam.

In a case that the identified candidate beam is a candidate beam in the first candidate beam set, since beams in the first candidate beam set are configured by the base station for the UE, the UE is not required to report the PCI of the identified candidate beam to the base station. On the other hand, in a case that the identified candidate beam includes the candidate beam in the second candidate beam set, since the identified candidate beam is not configured by the base station, the UE is further required to provide information of a cell to which the identified candidate beam belongs to the base station. At this time, the information of the identified candidate beam may further include a PCI of a cell corresponding to the identified candidate beam. Accordingly, the acquiring unit 202 is configured to acquire the information of the identified candidate beam and a PCI of a cell corresponding to the identified candidate beam from the UE. In this way, the base station may determine which non-serving cell the identified candidate beam belongs to. For example, the acquiring unit 202 may acquire the information of the identified candidate beam by receiving the MAC CE on the PUSCH.

A range of a candidate beam for BFR is extended to beams of the non-serving cell, and thus it is expected to provide a method for quickly determining the identified candidate beam to meet delay requirements of BFR.

Similarly, a double threshold determination method may be used. Specifically, the providing unit 201 is configured to provide the information of the first threshold and the second threshold to the UE. In a case that the number of times of occurrences of beam failure event instances reaches or exceeds the first threshold, the UE starts the determination of the identified candidate beam. In a case that the number of times of occurrences of the beam failure event instances reaches or exceeds the second threshold, the UE determines that a beam failure event occurs and starts the BFR procedure. The first threshold is smaller than or equal to the second threshold. Further, the providing unit 201 may provide the information of the first threshold and the second threshold to the UE through RRC signaling.

It can be seen that with the double threshold determination method, the determination of the identified candidate beam may be started before the BFR procedure is started (that is, UE reports the beam failure event to the base station), so that the UE can quickly provide the information of the identified candidate beam to the base station after the BFR procedure is started, thereby reducing the time delay. The specific description of the double threshold determination method is described in the first embodiment and is not repeated herein.

In addition, when a beam failure event occurs, recovering the beam to the non-serving cell incurs more signaling overhead than recovering the beam to the serving cell, and thus a specific condition may be set for recovering to the non-serving cell. For example, the providing unit 201 is further configured to provide, to the UE, conditions for the candidate beam of the non-serving cell being determined as the identified candidate beam. The conditions include, for example: beam quality of the candidate beam of the serving cell being lower than predetermined quality; and beam quality of the candidate beam of the non-serving cell being higher than the beam quality of the candidate beam of the serving cell by more than a predetermined value. For example, the providing unit 201 may provide settings about the predetermined quality and the predetermined value to the UE. The providing unit 201 may provide the settings through RRC signaling. Alternatively, the settings about the predetermined quality and the predetermined value may also be default by the UE and the base station.

By setting specific conditions, the communication quality of the UE can be improved, while unnecessary signaling overhead can be reduced as much as possible.

In a case that the identified candidate beam is the candidate beam of the non-serving cell in the first candidate beam set and/or the second candidate beam set, that is, in a case of determining that the UE is to recover to the candidate beam of the non-serving cell, considering that the original configuration of the UE may become invalid in a different cell, a process of the UE in an RRC connected state recovering to the non-serving cell would involve a cell handover. In order to simplify the complexity and reduce the signaling overhead and delay, the cell handover procedure may be combined with the BFR procedure.

For example, the providing unit 201 may transmit a handover request to the non-serving cell as a handover target when the acquiring unit 202 receives the BFRQ from the UE during the BFR procedure, the acquiring unit 202 receives a handover request acknowledgement from the non-serving cell, and the providing unit 201 provides the RRC reconfiguration information for the non-serving cell to the UE. For example, the RRC reconfiguration information for the non-serving cell may be included in the BFRR transmitted by the base station. The specific information procedure is described in detail in the first embodiment with reference to FIG. 6, and is not repeated herein.

By including the RRC reconfiguration information for the non-serving cell in the BFRR, the signaling overhead and the delay can be effectively reduced.

In summary, the electronic apparatus 200 according to the embodiment enables the UE to recover to the non-serving cell when a beam failure event occurs, thereby improving the communication quality of the UE. In addition, by improving the identification operation of the candidate beam and/or improving the process of recovering to the non-serving cell, the signaling overhead and delay are reduced, further improving the communication quality of the UE.

Third Embodiment

In the above description of embodiments of the electronic apparatuses for wireless communications, it is apparent that some processing and methods are further disclosed. In the following, a summary of the methods are described without repeating details that are described above. However, it should be noted that although the methods are disclosed when describing the electronic apparatuses for wireless communications, the methods are unnecessary to adopt those components or to be performed by those components described above. For example, implementations of the electronic apparatuses for wireless communications may be partially or completely implemented by hardware and/or firmware. Methods for wireless communications to be discussed blow may be completely implemented by computer executable programs, although these methods may be implemented by the hardware and/or firmware for implementing the electronic apparatuses for wireless communications.

Figure 8:
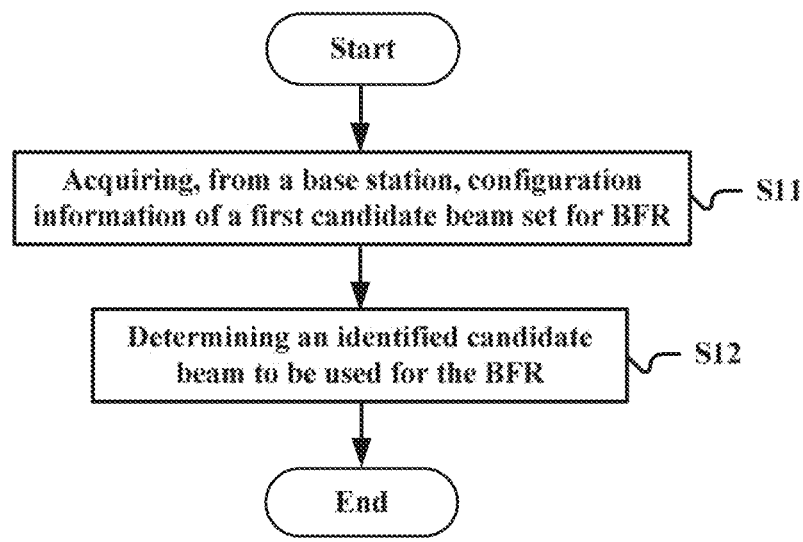
FIG. 8 is a flow chart showing a method for wireless communications according to an embodiment of the present disclosure.

FIG. 8 is a flow chart showing a method for wireless communications according to an embodiment of the present disclosure. The method includes: acquiring, from a base station, configuration information including a first candidate beam set for BFR, where the first candidate beam set includes a candidate beam of a serving cell and a candidate beam of a non-serving cell (S11); and determining an identified candidate beam to be used for the BFR based on the first candidate beam set and/or a second candidate beam set (S12), where the second candidate beam set includes a beam of a non-serving cell which serves as a candidate beam and is detected by user equipment. The method for example, may be performed at a UE side.

For example, the second candidate beam set includes a beam corresponding to a SSB of the non-serving cell which is detected by the UE. A PCI of the cell corresponding to the candidate beam in the second candidate beam set may be determined by decoding a primary synchronization signal/a secondary synchronization signal.

The configuration information may include an index of a reference signal corresponding to the candidate beam and a PCI of a cell corresponding to the reference signal. The reference signal may be one of the SSB and the CSI-RS. For example, the candidate beam in the first candidate beam set may include a beam corresponding to a reference signal for mobility management configured by the base station for the UE.

In an example, a candidate beam of a non-serving cell in the first candidate beam set and/or the second candidate beam set may be determined as the identified candidate beam in the following conditions: beam quality of the candidate beam of the serving cell being lower than predetermined quality; and beam quality of the candidate beam of the non-serving cell being higher than the beam quality of the candidate beam of the serving cell by more than a predetermined value. Settings of the predetermined quality and the predetermined value may be acquired from the base station.

In a case that the identified candidate beam includes a candidate beam in the second candidate beam set, the UE provides, to the base station, information of the candidate beam belonging to the second candidate beam set which is included in the identified candidate beam and a PCI of a cell corresponding to the candidate beam. For example, information of the identified candidate beam may be provided by transmitting MAC CE on a physical uplink shared channel.

For example, in a case that the identified candidate beam is a candidate beam of a non-serving cell in the first candidate beam set and/or the second candidate beam set, RRC reconfiguration information for the non-serving cell may be acquired from the base station during the BFR procedure. The RRC reconfiguration information for the non-serving cell may be included in the BFRR transmitted by the base station.

In addition, the method further includes acquiring, from the base station, information of a first threshold and a second threshold, where in a case that the number of times of occurrences of beam failure event instances reaches or exceeds the first threshold, determination of the identified candidate beam is started; in a case that the number of times of occurrences of the beam failure event instances reaches or exceeds the second threshold, it is determined that a beam failure event occurs and a beam failure recovery procedure is started, where the first threshold is smaller than or equal to the second threshold.

For example, a first counter and a second counter are established respectively to count the number of times of occurrences of the beam failure event instances, a count value of the first counter is compared with the first threshold, and a count value of the second counter is compared with the second threshold. Information of the first threshold and the second threshold may be acquired from the base station through RRC signaling.

Figure 9:
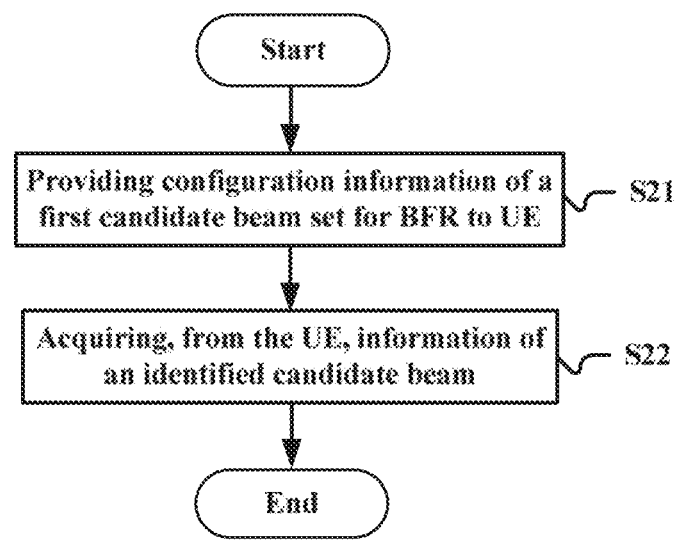
FIG. 9 is a flow chart showing a method for wireless communications according to another embodiment of the present disclosure.

FIG. 9 is a flow chart showing a method for wireless communications according to another embodiment of the present disclosure. The method includes: providing, to UE, configuration information including a first candidate beam set for beam failure recovery, where the first candidate beam set includes a candidate beam of a serving cell and a candidate beam of a non-serving cell (S21); and acquiring, from the UE, information of an identified candidate beam to be used for the BFR determined by the UE based on the first candidate beam set and/or a second candidate beam set (S22), where the second candidate beam set includes a beam of a non-serving cell which serves as a candidate beam and is detected by user equipment. The method for example, may be performed at a base station side.

For example, the second candidate beam set may include a beam corresponding to a SSB of the non-serving cell which is detected by the UE.

The configuration information may include an index of a reference signal corresponding to the candidate beam and a PCI of a cell corresponding to the reference signal. The reference signal may be one of the SSB and the CSI-RS. The candidate beam in the first candidate beam set may include a beam corresponding to a reference signal for mobility management configured by the base station for the UE.

In a case that the identified candidate beam includes a candidate beam in the second candidate beam set, information of the candidate beam and a PCI of a cell corresponding to the candidate beam are acquired from the UE. For example, information of the identified candidate beam may be acquired by receiving MAC CE on a PUSCH.

The method further includes providing information of a first threshold and a second threshold to the UE. In a case that the number of times of occurrences of beam failure event instances reaches or exceeds the first threshold, the UE starts the determination of the identified candidate beam. In a case that the number of times of occurrences of the beam failure event instances reaches or exceeds the second threshold, the UE determines that a beam failure event occurs and starts the BFR procedure. The first threshold is smaller than or equal to the second threshold. For example, the information of the first threshold and the second threshold may be provided to the UE through RRC signaling.

Further, conditions for the candidate beam of the non-serving cell being determined as the identified candidate beam can be provided to the UE. The condition includes: beam quality of the candidate beam of the serving cell being lower than predetermined quality; and beam quality of the candidate beam of the non-serving cell being higher than the beam quality of the candidate beam of the serving cell by more than a predetermined value. For example, settings about the predetermined quality and the predetermined value may be provided to the UE.

In a case that the identified candidate beam is the candidate beam of the non-serving cell in the first candidate beam set and/or the second candidate beam set, a handover request is transmitted to the non-serving cell when the UE receives the BFRQ during the BFR procedure, a handover request acknowledgement from the non-serving cell is received, and the RRC reconfiguration information for the non-serving cell is provided to the UE. The RRC reconfiguration information for the non-serving cell may be, for example, included in the BFRR.

Note that the above methods may be used in combination with each other or separately, the details of which are described in the first embodiment and the second embodiment and are not repeated herein.

The technology of the present disclosure is applicable to various products.

For example, the electronic apparatus 200 may be implemented as various base stations. The base station may be implemented as any type of evolved Node B (eNB) or gNB (5G base station). The eNB includes, for example, a macro eNB and a small eNB. The small eNB may be an eNB of a cell with coverage smaller than that of a macro cell, such as a pico-eNB, a micro-eNB and a household (femto) eNB. The gNB is similar to the eNB. Alternatively, the base station may be implemented as any other type of base stations, such as a NodeB and a base transceiver station (BTS). The base station may include a main body (also referred to as a base station device) configured to control wireless communications, and one or more remote radio heads (RRH) arranged in a different place from the main body. In addition, various types of user equipment may each serve as a base station by performing functions of the base station temporarily or semi-permanently.

The electronic device 100 may be implemented as various user equipments. The user equipment may be implemented as a mobile terminal (such as a smartphone, a tablet personal computer (PC), a notebook PC, a portable game terminal, a portable/dongle type mobile router, and a digital camera), or an in-vehicle terminal (such as a car navigation device). The user equipment may also be implemented as a terminal (that is also referred to as a machine type communication (MTC) terminal) that performs machine-to-machine (M2M) communication. Furthermore, the user equipment may be a wireless communication module (such as an integrated circuit module including a single die) mounted on each of the terminals.

[Application Examples Regarding a Base Station]

First Embodiment

Figure 10:
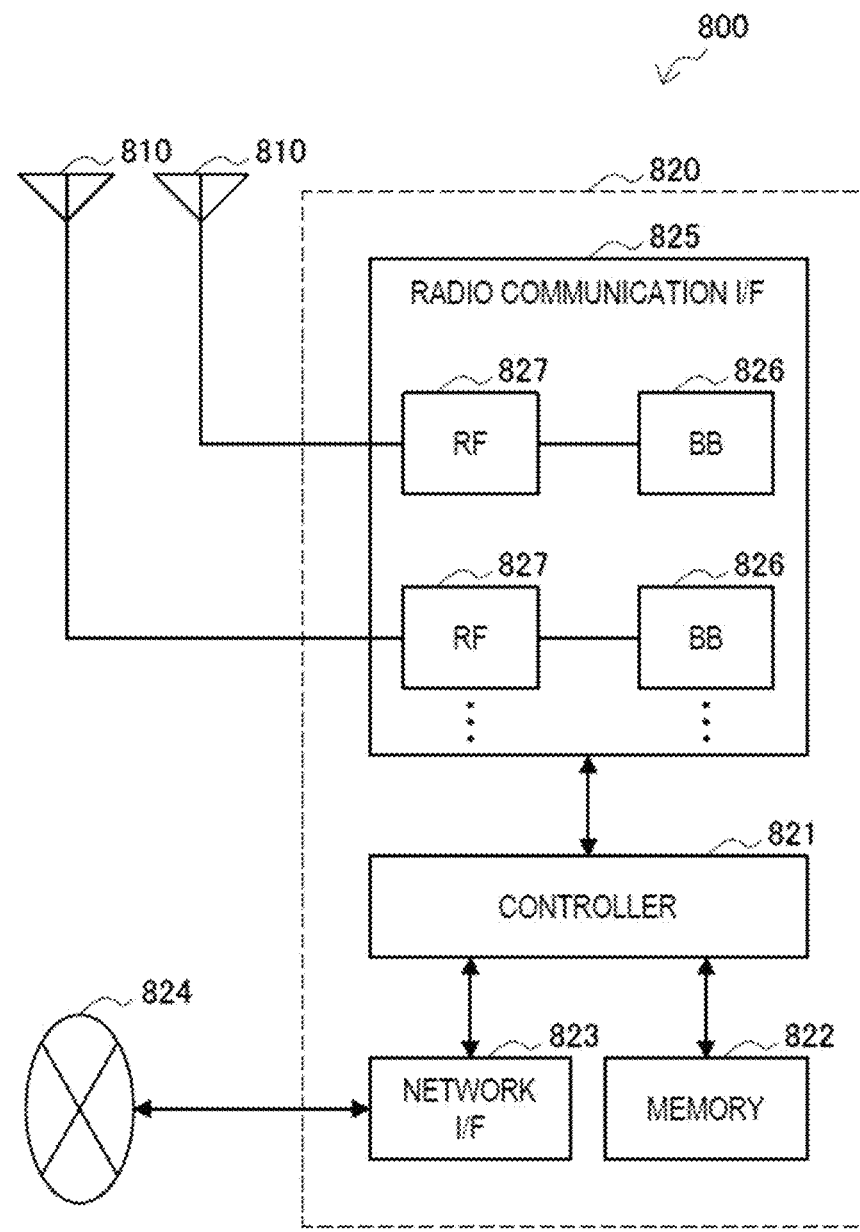
FIG. 10 is a block diagram showing a first example of an exemplary configuration of an eNB or gNB to which the technology of the present disclosure may be applied.

FIG. 10 is a block diagram showing a first example of an exemplary configuration of an eNB or gNB to which the technology according to the present disclosure may be applied. It should be noted that the following description is given by taking the eNB as an example, which is also applicable to the gNB. An eNB 800 includes one or more antennas 810 and a base station apparatus 820. The base station apparatus 820 and each of the antennas 810 may be connected to each other via a radio frequency (RF) cable.

Each of the antennas 810 includes a single or multiple antennal elements (such as multiple antenna elements included in a multiple-input multiple-output (MIMO) antenna), and is used for the base station apparatus 820 to transmit and receive wireless signals. As shown in FIG. 10, the eNB 800 may include the multiple antennas 810. For example, the multiple antennas 810 may be compatible with multiple frequency bands used by the eNB 800. Although FIG. 10 shows the example in which the eNB 800 includes the multiple antennas 810, the eNB 800 may include a single antenna 810.

The base station apparatus 820 includes a controller 821, a memory 822, a network interface 823, and a radio communication interface 825.

The controller 821 may be, for example, a CPU or a DSP, and operates various functions of a higher layer of the base station apparatus 820. For example, the controller 821 generates a data packet from data in signals processed by the radio communication interface 825, and transfers the generated packet via the network interface 823. The controller 821 may bundle data from multiple base band processors to generate the bundled packet, and transfer the generated bundled packet. The controller 821 may have logical functions of performing control such as resource control, radio bearer control, mobility management, admission control and scheduling. The control may be performed in corporation with an eNB or a core network node in the vicinity. The memory 822 includes a RAM and a ROM, and stores a program executed by the controller 821 and various types of control data (such as a terminal list, transmission power data and scheduling data).

The network interface 823 is a communication interface for connecting the base station apparatus 820 to a core network 824. The controller 821 may communicate with a core network node or another eNB via the network interface 823. In this case, the eNB 800, and the core network node or another eNB may be connected to each other via a logic interface (such as an S1 interface and an X2 interface). The network interface 823 may also be a wired communication interface or a wireless communication interface for wireless backhaul. In a case that the network interface 823 is a wireless communication interface, the network interface 823 may use a higher frequency band for wireless communication than that used by the radio communication interface 825.

The radio communication interface 825 supports any cellular communication scheme (such as Long Term Evolution (LTE) and LTE-advanced), and provides wireless connection to a terminal located in a cell of the eNB 800 via the antenna 810. The radio communication interface 825 may typically include, for example, a baseband (BB) processor 826 and an RF circuit 827. The BB processor 826 may perform, for example, encoding/decoding, modulating/demodulating, and multiplexing/demultiplexing, and perform various types of signal processing of layers (such as L1, Media Access Control (MAC), Radio Link Control (RLC), and a Packet Data Convergence Protocol (PDCP)). The BB processor 826 may have a part or all of the above-described logical functions, to replace the controller 821. The BB processor 826 may be a memory storing communication control programs, or a module including a processor and a related circuit configured to execute the programs. Updating the program may allow the functions of the BB processor 826 to be changed. The module may be a card or a blade inserted into a slot of the base station apparatus 820. Alternatively, the module may be a chip mounted on the card or the blade. Meanwhile, the RF circuit 827 may include, for example, a mixer, a filter, and an amplifier, and transmits and receives wireless signals via the antenna 810.

As shown in FIG. 10, the radio communication interface 825 may include multiple BB processors 826. For example, the multiple BB processors 826 may be compatible with multiple frequency bands used by the eNB 800. The radio communication interface 825 may include multiple RF circuits 827, as shown in FIG. 10. For example, the multiple RF circuits 827 may be compatible with multiple antenna elements. Although FIG. 10 shows the example in which the radio communication interface 825 includes multiple BB processors 826 and multiple RF circuits 827, the radio communication interface 825 may include a single BB processor 826 and a single RF circuit 827.

In the eNB 800 shown in FIG. 10, the providing unit 201, the acquiring unit 202, and the transceiver of the electronic apparatus 200 may be implemented by the radio communication interface 825. At least a part of the functions may be implemented by the controller 821. For example, the controller 821 may enable the UE to recover to the non-serving cell when a beam failure event occurs by performing the functions of the providing unit 201 and the acquiring unit 202.

Second Embodiment

Figure 11:
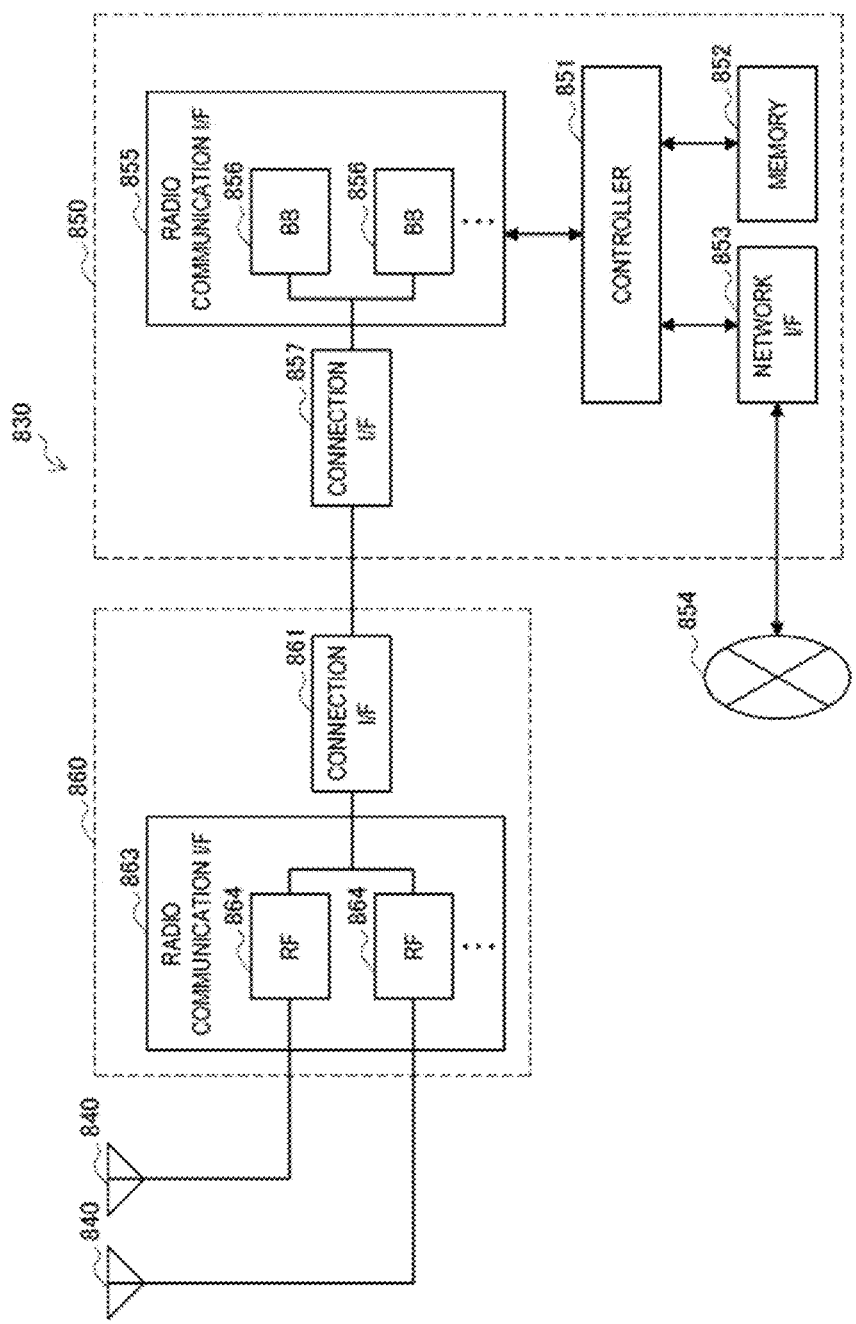
FIG. 11 is a block diagram showing a second example of an exemplary configuration of an eNB or gNB to which the technology of the present disclosure may be applied.

FIG. 11 is a block diagram showing a second example of an exemplary configuration of an eNB or gNB to which the technology according to the present disclosure may be applied. It should be noted that the following description is given by taking the eNB as an example, which is also applied to the gNB. An eNB 830 includes one or more antennas 840, a base station apparatus 850, and an RRH 860. The RRH 860 and each of the antennas 840 may be connected to each other via an RF cable. The base station apparatus 850 and the RRH 860 may be connected to each other via a high speed line such as an optical fiber cable.

Each of the antennas 840 includes a single or multiple antennal elements (such as multiple antenna elements included in an MIMO antenna), and is used for the RRH 860 to transmit and receive wireless signals. As shown in FIG. 11, the eNB 830 may include multiple antennas 840. For example, the multiple antennas 840 may be compatible with multiple frequency bands used by the eNB 830. Although FIG. 11 shows the example in which the eNB 830 includes multiple antennas 840, the eNB 830 may include a single antenna 840.

The base station apparatus 850 includes a controller 851, a memory 852, a network interface 853, a radio communication interface 855, and a connection interface 857. The controller 851, the memory 852, and the network interface 853 are the same as the controller 821, the memory 822, and the network interface 823 described with reference to FIG. 10.

The radio communication interface 855 supports any cellular communication scheme (such as LTE and LTE-advanced), and provides wireless communication to a terminal located in a sector corresponding to the RRH 860 via the RRH 860 and the antenna 840. The radio communication interface 855 may typically include, for example, a BB processor 856. The BB processor 856 is the same as the BB processor 826 described with reference to FIG. 10, except that the BB processor 856 is connected to an RF circuit 864 of the RRH 860 via the connection interface 857. As show in FIG. 11, the radio communication interface 855 may include multiple BB processors 856. For example, the multiple BB processors 856 may be compatible with multiple frequency bands used by the eNB 830. Although FIG. 11 shows the example in which the radio communication interface 855 includes multiple BB processors 856, the radio communication interface 855 may include a single BB processor 856.

The connection interface 857 is an interface for connecting the base station apparatus 850 (radio communication interface 855) to the RRH 860. The connection interface 857 may also be a communication module for communication in the above-described high speed line that connects the base station apparatus 850 (radio communication interface 855) to the RRH 860.

The RRH 860 includes a connection interface 861 and a radio communication interface 863.

The connection interface 861 is an interface for connecting the RRH 860 (radio communication interface 863) to the base station apparatus 850. The connection interface 861 may also be a communication module for communication in the above-described high speed line.

The radio communication interface 863 transmits and receives wireless signals via the antenna 840. The radio communication interface 863 may typically include, for example, an RF circuit 864. The RF circuit 864 may include, for example, a mixer, a filter and an amplifier, and transmits and receives wireless signals via the antenna 840. The radio communication interface 863 may include multiple RF circuits 864, as shown in FIG. 11. For example, the multiple RF circuits 864 may support multiple antenna elements. Although FIG. 11 shows the example in which the radio communication interface 863 includes multiple RF circuits 864, the radio communication interface 863 may include a single RF circuit 864.

In the eNB 830 shown in FIG. 11, the providing unit 201, the acquiring unit 202, and the transceiver of the electronic apparatus 200 may be implemented by the radio communication interface 855 and/or the communication interface 863. At least a part of the functions may be implemented by the controller 851. For example, controller 851 may enable the UE to recover to the non-serving cell when a beam failure event occurs by performing the functions of the providing unit 201 and the acquiring unit 202.

[Application Examples Regarding User Equipment]

First Application Example

Figure 12:
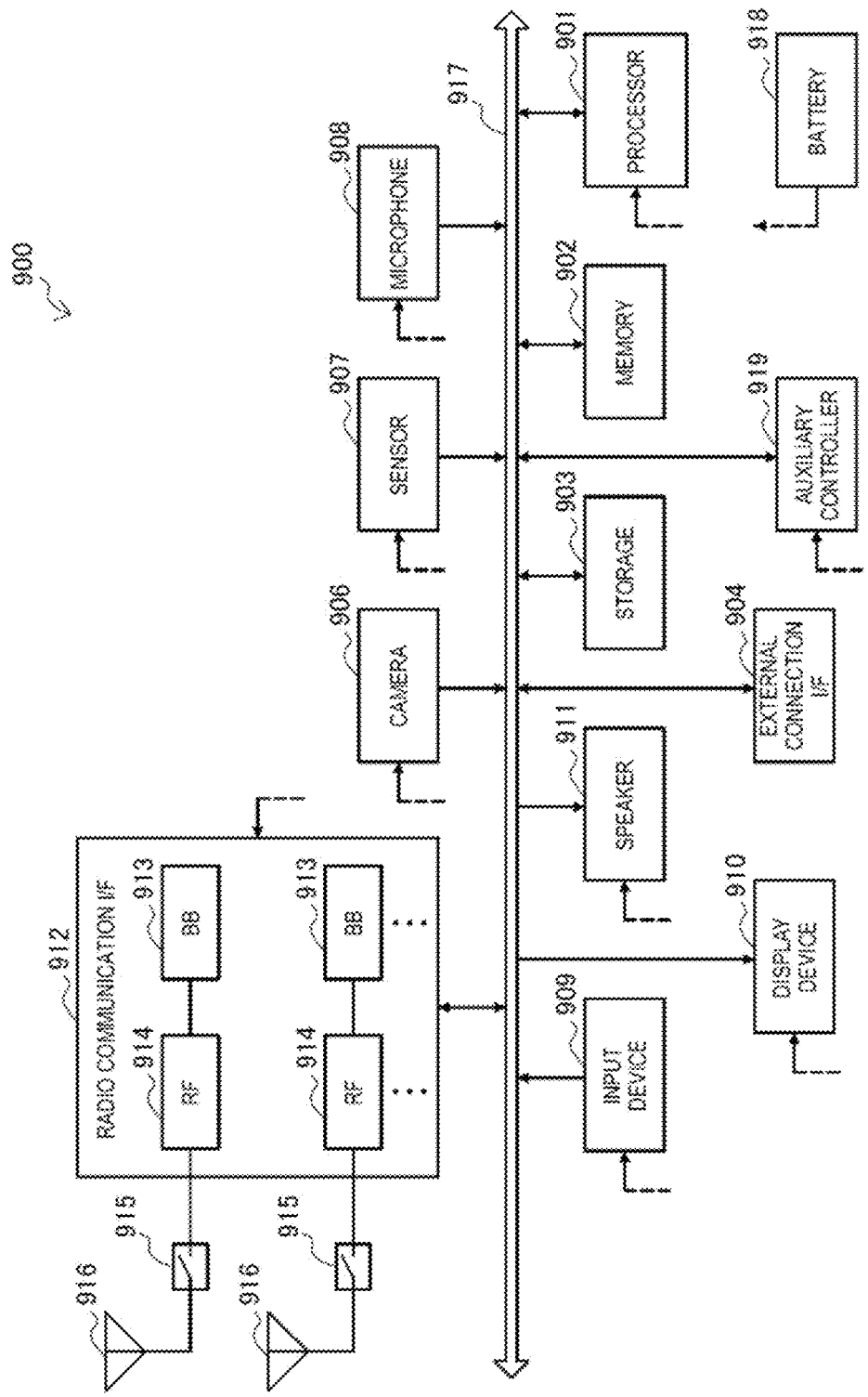
FIG. 12 is a block diagram showing an example of an exemplary configuration of a smartphone to which the technology according to the present disclosure may be applied.

FIG. 12 is a block diagram showing an exemplary configuration of a smartphone 900 to which the technology according to the present disclosure may be applied. The smartphone 900 includes a processor 901, a memory 902, a storage 903, an external connection interface 904, a camera 906, a sensor 907, a microphone 908, an input device 909, a display device 910, a speaker 911, a radio communication interface 912, one or more antenna switches 915, one or more antennas 916, a bus 917, a battery 918, and an auxiliary controller 919.

The processor 901 may be, for example, a CPU or a system on a chip (SoC), and controls functions of an application layer and another layer of the smartphone 900. The memory 902 includes a RAM and a ROM, and stores a program executed by the processor 901 and data. The storage 903 may include a storage medium such as a semiconductor memory and a hard disk. The external connection interface 904 is an interface for connecting an external device (such as a memory card and a universal serial bus (USB) device) to the smartphone 900.

The camera 906 includes an image sensor (such as a charge coupled device (CCD) and a complementary metal oxide semiconductor (CMOS)), and generates a captured image. The sensor 907 may include a group of sensors, such as a measurement sensor, a gyro sensor, a geomagnetism sensor, and an acceleration sensor. The microphone 908 converts sounds inputted to the smartphone 900 to audio signals. The input device 909 includes, for example, a touch sensor configured to detect touch onto a screen of the display device 910, a keypad, a keyboard, a button, or a switch, and receives an operation or information inputted from a user. The display device 910 includes a screen (such as a liquid crystal display (LCD) and an organic light-emitting diode (OLED) display), and displays an output image of the smartphone 900. The speaker 911 converts audio signals outputted from the smartphone 900 to sounds.

The radio communication interface 912 supports any cellular communication scheme (such as LTE and LTE-advanced), and performs wireless communications. The radio communication interface 912 may include, for example, a BB processor 913 and an RF circuit 914. The BB processor 913 may perform, for example, encoding/decoding, modulating/demodulating, and multiplexing/de-multiplexing, and perform various types of signal processing for wireless communication. The RF circuit 914 may include, for example, a mixer, a filter and an amplifier, and transmits and receives wireless signals via the antenna 916. It should be noted that although FIG. 12 shows a case that one RF link is connected to one antenna, which is only illustrative, and a situation where one RF link is connected to multiple antennas through multiple phase shifters is also possible. The radio communication interface 912 may be a chip module having the BB processor 913 and the RF circuit 914 integrated thereon. The radio communication interface 912 may include multiple BB processors 913 and multiple RF circuits 914, as shown in FIG. 12. Although FIG. 12 shows the example in which the radio communication interface 912 includes multiple BB processors 913 and multiple RF circuits 914, the radio communication interface 912 may include a single BB processor 913 or a single RF circuit 914.

Furthermore, in addition to a cellular communication scheme, the radio communication interface 912 may support another type of wireless communication scheme such as a short-distance wireless communication scheme, a near field communication scheme, and a wireless local area network (LAN) scheme. In this case, the radio communication interface 912 may include the BB processor 913 and the RF circuit 914 for each wireless communication scheme.

Each of the antenna switches 915 switches connection destinations of the antennas 916 among multiple circuits (such as circuits for different wireless communication schemes) included in the radio communication interface 912.

Each of the antennas 916 includes a single or multiple antenna elements (such as multiple antenna elements included in an MIMO antenna) and is used for the radio communication interface 912 to transmit and receive wireless signals. The smartphone 900 may include the multiple antennas 916, as shown in FIG. 12. Although FIG. 12 shows the example in which the smartphone 900 includes multiple antennas 916, the smartphone 900 may include a single antenna 916.

Furthermore, the smartphone 900 may include the antenna 916 for each wireless communication scheme. In this case, the antenna switches 915 may be omitted from the configuration of the smartphone 900.

The bus 917 connects the processor 901, the memory 902, the storage 903, the external connection interface 904, the camera 906, the sensor 907, the microphone 908, the input device 909, the display device 910, the speaker 911, the radio communication interface 912, and the auxiliary controller 919 to each other. The battery 918 supplies power to blocks of the smartphone 900 shown in FIG. 12 via feeder lines, which are partially shown as dashed lines in FIG. 12. The auxiliary controller 919 operates a minimum necessary function of the smartphone 900, for example, in a sleep mode.

In the smartphone 900 shown in FIG. 12, the acquiring unit 101, the reporting unit 103 and the transceiver of the electronic apparatus 100 may be implemented by the radio communication interface 912. At least a part of the functions may be implemented by the processor 901 or the auxiliary controller 919. For example, the processor 901 or the auxiliary controller 919 may enable the UE to recover to the non-serving cell when a beam failure event occurs by performing the functions of the acquiring unit 101, the determining unit 102 and the reporting unit 103.

Second Embodiment

Figure 13:
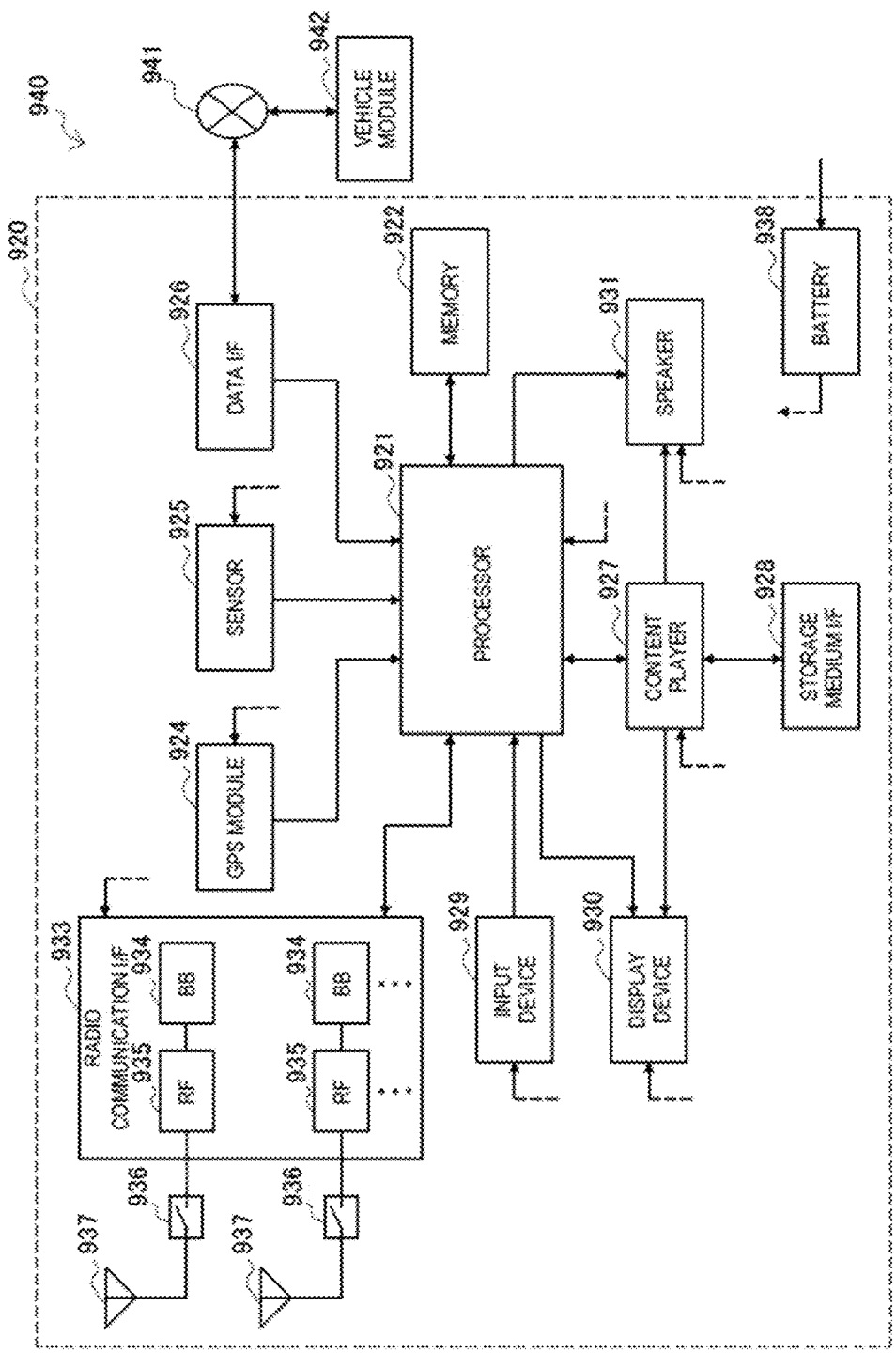
FIG. 13 is a block diagram showing an example of an exemplary configuration of a car navigation apparatus to which the technology according to the present disclosure may be applied.

FIG. 13 is a block diagram showing an example of a schematic configuration of a car navigation apparatus 920 to which the technology according to the present disclosure may be applied. The car navigation apparatus 920 includes a processor 921, a memory 922, a global positioning system (GPS) module 924, a sensor 925, a data interface 926, a content player 927, a storage medium interface 928, an input device 929, a display device 930, a speaker 931, a radio communication interface 933, one or more antenna switches 936, one or more antennas 937, and a battery 938.

The processor 921 may be, for example a CPU or a SoC, and controls a navigation function and additional function of the car navigation apparatus 920. The memory 922 includes RAM and ROM, and stores a program executed by the processor 921, and data.

The GPS module 924 determines a position (such as latitude, longitude and altitude) of the car navigation apparatus 920 by using GPS signals received from a GPS satellite. The sensor 925 may include a group of sensors such as a gyro sensor, a geomagnetic sensor and an air pressure sensor. The data interface 926 is connected to, for example, an in-vehicle network 941 via a terminal that is not shown, and acquires data (such as vehicle speed data) generated by the vehicle.

The content player 927 reproduces content stored in a storage medium (such as a CD and DVD) that is inserted into the storage medium interface 928. The input device 929 includes, for example, a touch sensor configured to detect touch onto a screen of the display device 930, a button, or a switch, and receives an operation or information inputted from a user. The display device 930 includes a screen such as an LCD or OLED display, and displays an image of the navigation function or reproduced content. The speaker 931 outputs a sound for the navigation function or the reproduced content.

The radio communication interface 933 supports any cellular communication scheme (such as LTE and LTE-Advanced), and performs wireless communication. The radio communication interface 933 may typically include, for example, a BB processor 934 and an RF circuit 935. The BB processor 934 may perform, for example, encoding/decoding, modulating/demodulating and multiplexing/demultiplexing, and perform various types of signal processing for wireless communication. The RF circuit 935 may include, for example, a mixer, a filter and an amplifier, and transmits and receives wireless signals via the antenna 937. The radio communication interface 933 may also be a chip module having the BB processor 934 and the RF circuit 935 integrated thereon. The radio communication interface 933 may include multiple BB processors 934 and multiple RF circuits 935, as shown in FIG. 13. Although FIG. 13 shows the example in which the radio communication interface 933 includes multiple BB processors 934 and multiple RF circuits 935, the radio communication interface 933 may include a single BB processor 934 and a single RF circuit 935.

Furthermore, in addition to a cellular communication scheme, the radio communication interface 933 may support another type of wireless communication scheme such as a short-distance wireless communication scheme, a near field communication scheme, and a wireless LAN scheme. In this case, the radio communication interface 933 may include the BB processor 934 and the RF circuit 935 for each wireless communication scheme.

Each of the antenna switches 936 switches connection destinations of the antennas 937 among multiple circuits (such as circuits for different wireless communication schemes) included in the radio communication interface 933.

Each of the antennas 937 includes a single or multiple antenna elements (such as multiple antenna elements included in an MIMO antenna), and is used for the radio communication interface 933 to transmit and receive wireless signals. As shown in FIG. 13, the car navigation apparatus 920 may include multiple antennas 937. Although FIG. 13 shows the example in which the car navigation apparatus 920 includes multiple antennas 937, the car navigation apparatus 920 may include a single antenna 937.

Furthermore, the car navigation apparatus 920 may include the antenna 937 for each wireless communication scheme. In this case, the antenna switches 936 may be omitted from the configuration of the car navigation apparatus 920.

Figure 14:
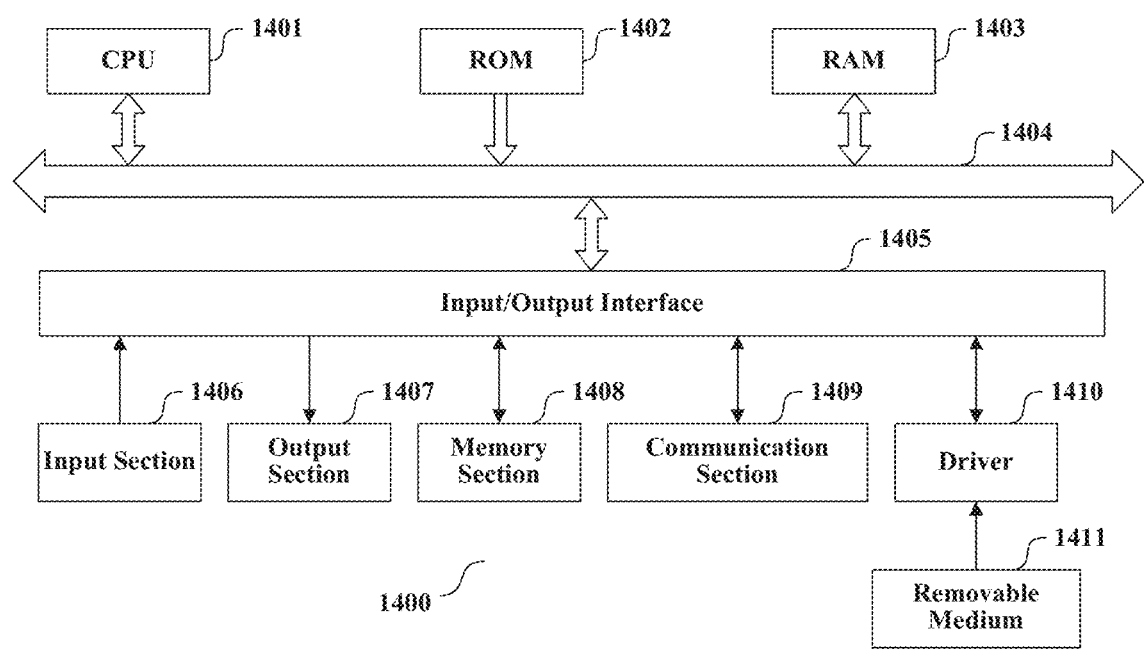
FIG. 14 is a block diagram of an exemplary block diagram illustrating the structure of a general purpose personal computer capable of realizing the method and/or device and/or system according to the embodiments of the present disclosure.

The battery 938 supplies power to the blocks of the car navigation apparatus 920 shown in FIG. 13 via feeder lines that are partially shown as dash lines in FIG. 14. The battery 938 accumulates power supplied from the vehicle.

In the car navigation apparatus 920 shown in FIG. 13, the acquiring unit 101, the reporting unit 103 and the transceiver of the electronic apparatus 100 may be implemented by the radio communication interface 933. At least part of the functions may be implemented by the processor 921. For example, the processor 921 may enable the UE to recover to the non-serving cell when a beam failure event occurs by performing the functions of the acquiring unit 101, the determining unit 102 and the reporting unit 103.

The technology according to the present disclosure may also be implemented as an in-vehicle system (or a vehicle) 940 including one or more blocks of the car navigation device 920, the in-vehicle network 941, and a vehicle module 942. The vehicle module 942 generates vehicle data (such as vehicle speed, engine speed, and failure information), and outputs the generated data to the in-vehicle network 941.

The basic principle of the present disclosure has been described above in conjunction with particular embodiments. However, as can be appreciated by those ordinarily skilled in the art, all or any of the steps or components of the method and apparatus according to the disclosure can be implemented with hardware, firmware, software or a combination thereof in any computing device (including a processor, a storage medium, etc.) or a network of computing devices by those ordinarily skilled in the art in light of the disclosure of the disclosure and making use of their general circuit designing knowledge or general programming skills.

Moreover, the present disclosure further discloses a program product in which machine-readable instruction codes are stored. The aforementioned methods according to the embodiments can be implemented when the instruction codes are read and executed by a machine.

Accordingly, a memory medium for carrying the program product in which machine-readable instruction codes are stored is also covered in the present disclosure. The memory medium includes but is not limited to soft disc, optical disc, magnetic optical disc, memory card, memory stick and the like.

In the case where the present disclosure is realized with software or firmware, a program constituting the software is installed in a computer with a dedicated hardware structure (e.g. the general computer 1400 shown in FIG. 14) from a storage medium or network, wherein the computer is capable of implementing various functions when installed with various programs.

In FIG. 14, a central processing unit (CPU) 1401 executes various processing according to a program stored in a read-only memory (ROM) 1402 or a program loaded to a random access memory (RAM) 1403 from a memory section 1408. The data needed for the various processing of the CPU 1401 may be stored in the RAM 1403 as needed. The CPU 1401, the ROM 1402 and the RAM 1403 are linked with each other via a bus 1404. An input/output interface 1405 is also linked to the bus 1404.

The following components are linked to the input/output interface 1405: an input section 1406 (including keyboard, mouse and the like), an output section 1407 (including displays such as a cathode ray tube (CRT), a liquid crystal display (LCD), a loudspeaker and the like), a memory section 1408 (including hard disc and the like), and a communication section 1409 (including a network interface card such as a LAN card, modem and the like). The communication section 1409 performs communication processing via a network such as the Internet. A driver 1410 may also be linked to the input/output interface 1405, if needed. If needed, a removable medium 1411, for example, a magnetic disc, an optical disc, a magnetic optical disc, a semiconductor memory and the like, may be installed in the driver 1410, so that the computer program read therefrom is installed in the memory section 1408 as appropriate.

In the case where the foregoing series of processing is achieved through software, programs forming the software are installed from a network such as the Internet or a memory medium such as the removable medium 1411.

It should be appreciated by those skilled in the art that the memory medium is not limited to the removable medium 1411 shown in FIG. 14, which has program stored therein and is distributed separately from the apparatus so as to provide the programs to users. The removable medium 1411 may be, for example, a magnetic disc (including floppy disc (registered trademark)), a compact disc (including compact disc read-only memory (CD-ROM) and digital versatile disc (DVD), a magneto optical disc (including mini disc (MD) (registered trademark)), and a semiconductor memory. Alternatively, the memory medium may be the hard discs included in ROM 1402 and the memory section 1408 in which programs are stored, and can be distributed to users along with the device in which they are incorporated.

To be further noted, in the apparatus, method and system according to the present disclosure, the respective components or steps can be decomposed and/or recombined. These decompositions and/or re-combinations shall be regarded as equivalent solutions of the disclosure. Moreover, the above series of processing steps can naturally be performed temporally in the sequence as described above but will not be limited thereto, and some of the steps can be performed in parallel or independently from each other.

Finally, to be further noted, the term "include", "comprise" or any variant thereof is intended to encompass nonexclusive inclusion so that a process, method, article or device including a series of elements includes not only those elements but also other elements which have been not listed definitely or an element(s) inherent to the process, method, article or device. Moreover, the expression "comprising a(n) . . . " in which an element is defined will not preclude presence of an additional identical element(s) in a process, method, article or device comprising the defined element(s)" unless further defined.

Although the embodiments of the present disclosure have been described above in detail in connection with the drawings, it shall be appreciated that the embodiments as described above are merely illustrative rather than limitative of the present disclosure. Those skilled in the art can make various modifications and variations to the above embodiments without departing from the spirit and scope of the present disclosure. Therefore, the scope of the present disclosure is defined merely by the appended claims and their equivalents.

The invention claimed is:

1. An electronic apparatus for wireless communications, comprising:
processing circuitry, configured to:
acquire, from a base station, configuration information comprising a first candidate beam set for beam failure recovery, wherein the first candidate beam set comprises a candidate beam of a serving cell and a candidate beam of a non-serving cell; and
determine, based on the first candidate beam set or a second candidate beam set, an identified candidate beam to be used for the beam failure recovery, wherein the second candidate beam set comprises a beam of a non-serving cell which serves as a candidate beam and is detected by user equipment,
wherein the configuration information comprises an index of a reference signal corresponding to the candidate beam and a physical cell identification of a cell corresponding to the reference signal.

2. The electronic apparatus according to claim 1, wherein the second candidate beam set comprises a beam corresponding to a synchronization signal block of a non-serving cell which is detected by the user equipment.

3. The electronic apparatus according to claim 1, wherein the processing circuitry is configured to determine the candidate beam of a non-serving cell in the first candidate beam set or the second candidate beam set as the identified candidate beam in the following conditions:
beam quality of the candidate beam of the serving cell being lower than predetermined quality; and
beam quality of the candidate beam of the non-serving cell being higher than the beam quality of the candidate beam of the serving cell by more than a predetermined value.

4. The electronic apparatus according to claim 3, wherein the processing circuitry is further configured to acquire, from the base station, settings of the predetermined quality and the predetermined value.

5. The electronic apparatus according to claim 1, wherein, in a case that the identified candidate beam is a candidate beam of a non-serving cell in the first candidate beam set or the second candidate beam set, the processing circuitry is configured to acquire, from the base station, radio resources control reconfiguration information for the non-serving cell during the beam failure recovery procedure.

6. The electronic apparatus according to claim 5, wherein the radio resources control reconfiguration information for the non-serving cell is comprised in a beam failure recovery request response transmitted by the base station.

7. The electronic apparatus according to claim 1, wherein the reference signal is one of a synchronization signal block and a channel state information reference signal.

8. The electronic apparatus according to claim 1, wherein the candidate beam in the first candidate beam set comprises a beam corresponding to a reference signal for mobility management configured by the base station for the user equipment.

9. The electronic apparatus according to claim 1, wherein the processing circuitry is further configured to determine a physical cell identification of a cell corresponding to the candidate beam in the second candidate beam set by decoding a primary synchronization signal or a secondary synchronization signal.

10. The electronic apparatus according to claim 1, wherein, in a case that the identified candidate beam comprises a candidate beam in the second candidate beam set, the processing circuitry is further configured to provide, to the base station, information of the candidate beam belonging to the second candidate beam set which is comprised in the identified candidate beam and a physical cell identification of a cell corresponding to the candidate beam.

11. The electronic apparatus according to claim 10, wherein the processing circuitry is configured to provide information of the identified candidate beam by transmitting MAC CE on a physical uplink shared channel.

12. The electronic apparatus according to claim 1, wherein, the processing circuitry is further configured to acquire, from the base station, information of a first threshold and a second threshold, wherein
in a case that the number of times of occurrences of beam failure event instances reaches or exceeds the first threshold, the processing circuitry starts determination of the identified candidate beam; in a case that the number of times of occurrences of the beam failure event instances reaches or exceeds the second threshold, the processing circuitry determines that a beam failure event occurs and starts a beam failure recovery procedure,
wherein the first threshold is smaller than or equal to the second threshold.

13. The electronic apparatus according to claim 12, wherein the processing circuitry is configured to:
establish a first counter and a second counter respectively to count the number of times of occurrences of the beam failure event instances, compare a count value of the first counter with the first threshold, and compare a count value of the second counter with the second threshold.

14. The electronic apparatus according to claim 12, wherein the processing circuitry is configured to acquire, from the base station, information of the first threshold and the second threshold through radio resources control signaling.

15. An electronic apparatus for wireless communications, comprising:
processing circuitry, configured to:
provide, to user equipment, configuration information comprising a first candidate beam set for beam failure recovery, wherein the first candidate beam set comprises a candidate beam of a serving cell and a candidate beam of a non-serving cell; and
acquire, from the user equipment, information of an identified candidate beam to be used for the beam failure recovery determined by the user equipment based on the first candidate beam set or a second candidate beam set, wherein the second candidate beam set comprises a beam of a non-serving cell which serves as a candidate beam and is detected by the user equipment,
wherein the configuration information comprises an index of a reference signal corresponding to the candidate beam and a physical cell identification of a cell corresponding to the reference signal.

16. The electronic apparatus according to claim 15, wherein the processing circuitry is further configured to provide conditions for the candidate beam of the non-serving cell being determined as the identified candidate beam to the user equipment, and the conditions comprise:
beam quality of the candidate beam of the serving cell being lower than predetermined quality; and beam quality of the candidate beam of the non-serving cell being higher than the beam quality of the candidate beam of the serving cell by more than a predetermined value.

17. The electronic apparatus according to claim 15, wherein in a case that the identified candidate beam is a candidate beam of a non-serving cell in the first candidate beam set or the second candidate beam set, the processing circuitry is configured to transmit a handover request to the non-serving cell and receive a handover request acknowledgement from the non-serving cell upon receiving a beam failure recovery request from the user equipment during a beam failure recovery procedure, and provide radio resources control reconfiguration information for the non-serving cell to the user equipment.

18. The electronic apparatus according to claim 17, wherein the processing circuitry is configured to comprise the radio resources control reconfiguration information for the non-serving cell in a beam failure recovery request response to be provided to the user equipment.

19. A method for wireless communications, the method performed by an electronic apparatus and comprising:

acquiring, from a base station, configuration information comprising a first candidate beam set for beam failure recovery, wherein the first candidate beam set comprises a candidate beam of a serving cell and a candidate beam of a non-serving cell; and determining, based on the first candidate beam set or a second candidate beam set, an identified candidate beam to be used for the beam failure recovery, wherein the second candidate beam set comprises a beam of a non-serving cell which serves as a candidate beam and is detected by the user equipment, wherein the configuration information comprises an index of a reference signal corresponding to the candidate beam and a physical cell identification of a cell corresponding to the reference signal.

* * * * *